Patented June 24, 1930

1,767,780

UNITED STATES PATENT OFFICE

CHARLES URFER, OF GENEVA, SWITZERLAND, ASSIGNOR TO SOCIÉTÉ D'ETUDES MINIÈRES ET INDUSTRIELLES, OF PARIS, FRANCE, A CORPORATION OF FRANCE

PROCESS FOR THE MANUFACTURE OF AMMONIA

No Drawing. Original application filed January 2, 1926, Serial No. 79,039, and in France January 8, 1925. Divided and this application filed June 2, 1927. Serial No. 196,152.

This application is a division of applicant's copending application Serial No. 79,039, filed January 2, 1926, and entitled "Process for the manufacture of metallic nitrides" and relates to the synthetic production of ammonia.

In known processes, such as the Haber process, for the synthetic manufacture of ammonia, iron nitride is produced from the nitrogen contained in a mixture of hydrogen and nitrogen, and is then decomposed in the presence of alumina through the hydrogen in the mixture. To effect such reaction it has been found necessary to have very high pressures (Haber indicates a minimum pressure of 250 kg/cm$^2$).

In the synthetic manufacture of ammonia it has also been tried directly to produce the nitride of iron or of metals of the iron group at a less high pressure, but even when employing high temperatures of for example 1,400° C., it has been found impossible to produce iron nitride as it disassociates into its elements at a temperature lower than that necessary for its formation.

According to this invention, ammonia is produced at a relatively low pressure by causing a hot mixture of hydrogen and nitrogen to pass over iron, nickel, cobalt, tungsten or molybdenum or mixtures thereof admixed with a compound of lithium containing nitrogen and either alumina, magnesia, or lime, or mixtures thereof.

For example, a mixture of hydrogen and nitrogen is at a temperature of 550° to 600° C. passed over a mixture of three parts of iron powder, two parts of lithium nitride and 5 to 10% by weight of alumina. Ammonia is formed at a pressure of the order of atmospheric pressure.

In place of lithium nitride another compound of lithium containing nitrogen may be employed, such as lithium amide, for example. The iron may be replaced by either nickel, cobalt, tungsten or molybdenum.

In the following claims where alumina is specified as one of the elements of the catalyst, it is to be understood that other equivalent oxides, such as lime or magnesia, or mixtures of them may be used instead.

While the process constituting the subject matter of the present invention has been described in detail, it is to be expressly understood that the invention is not limited thereto except as particularly pointed out and defined in the appended claims.

What is claimed is:—

1. A process for the manufacture of ammonia which consists in causing a mixture of heated nitrogen and hydrogen to react in the presence of at least one metal of the iron group, a lithium nitrogenated compound which does not react when heated with hydrogen, and a compound from the group consisting of alumina, magnesia and lime.

2. A process for the manufacture of ammonia which consists in causing a mixture of heated nitrogen and hydrogen to react in the presence of at least one metal of the iron group, lithium nitride, and at least one compound from the group consisting of alumina, magnesia and lime.

3. A process for the manufacture of ammonia which consists in causing a mixture of heated nitrogen and hydrogen to react in the presence of at least one metal of the iron group, a lithium nitrogenated compound which does not react when heated with hydrogen, and aluminum oxide.

4. A process for the manufacture of ammonia which consists in causing a mixture of heated nitrogen and hydrogen to react in the presence of iron, a lithium nitrogen compound which does not react when heated with hydrogen, and a compound from the group consisting of alumina, magnesia and lime.

5. A process for the manufacture of ammonia which consists in causing a mixture of heated nitrogen and hydrogen to react in the presence of a metal of the iron group, lithium nitride, and alumina.

In testimony whereof I have affixed my signature.

CHARLES URFER.